July 8, 1969   R. M. WALLACE   3,454,490
CONCENTRATION OF IONS USING ION SELECTIVE MEMBRANES
Filed Aug. 10, 1966

INVENTOR.
BY *Richard M. Wallace*
*Attorney:*

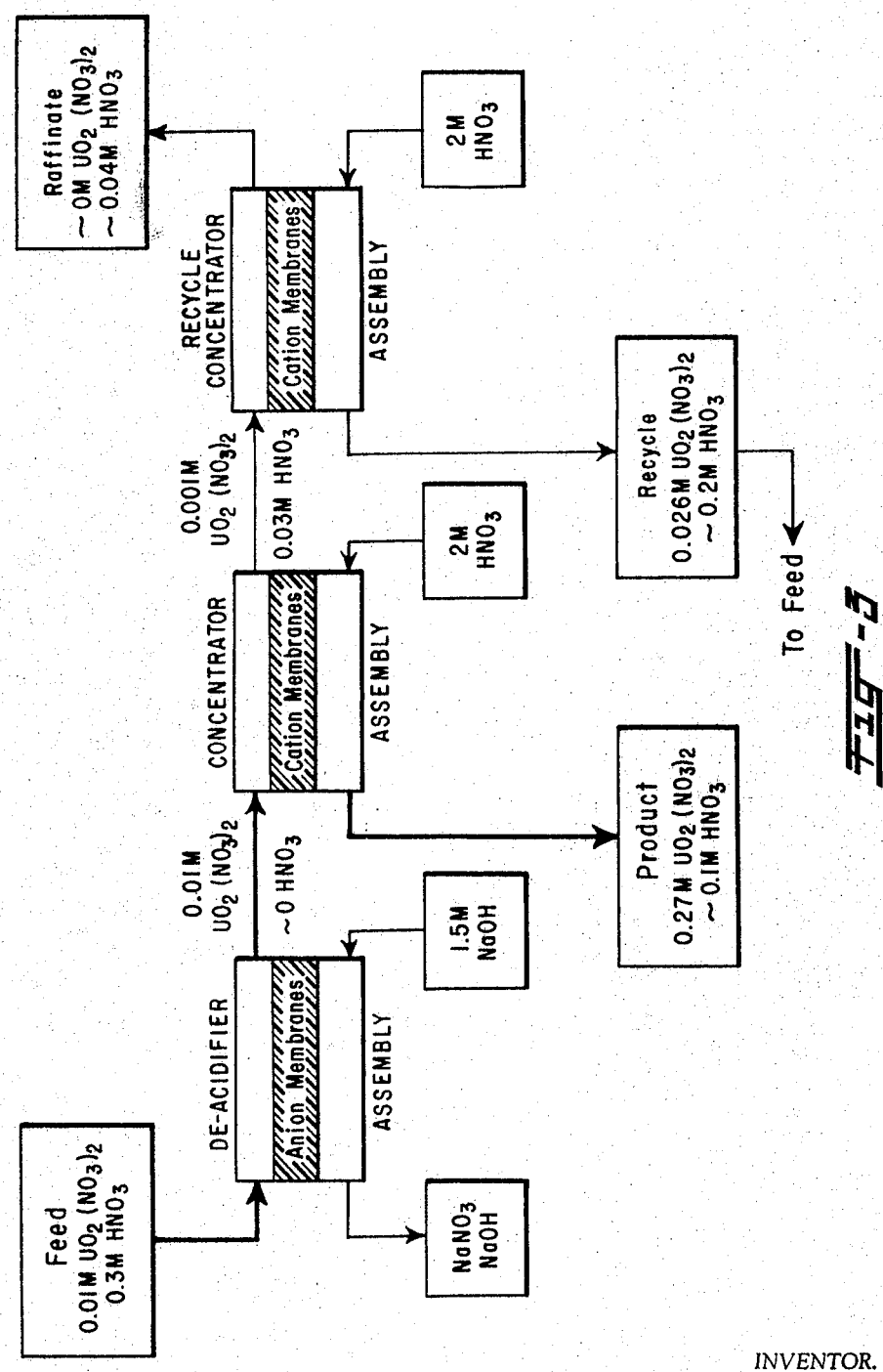

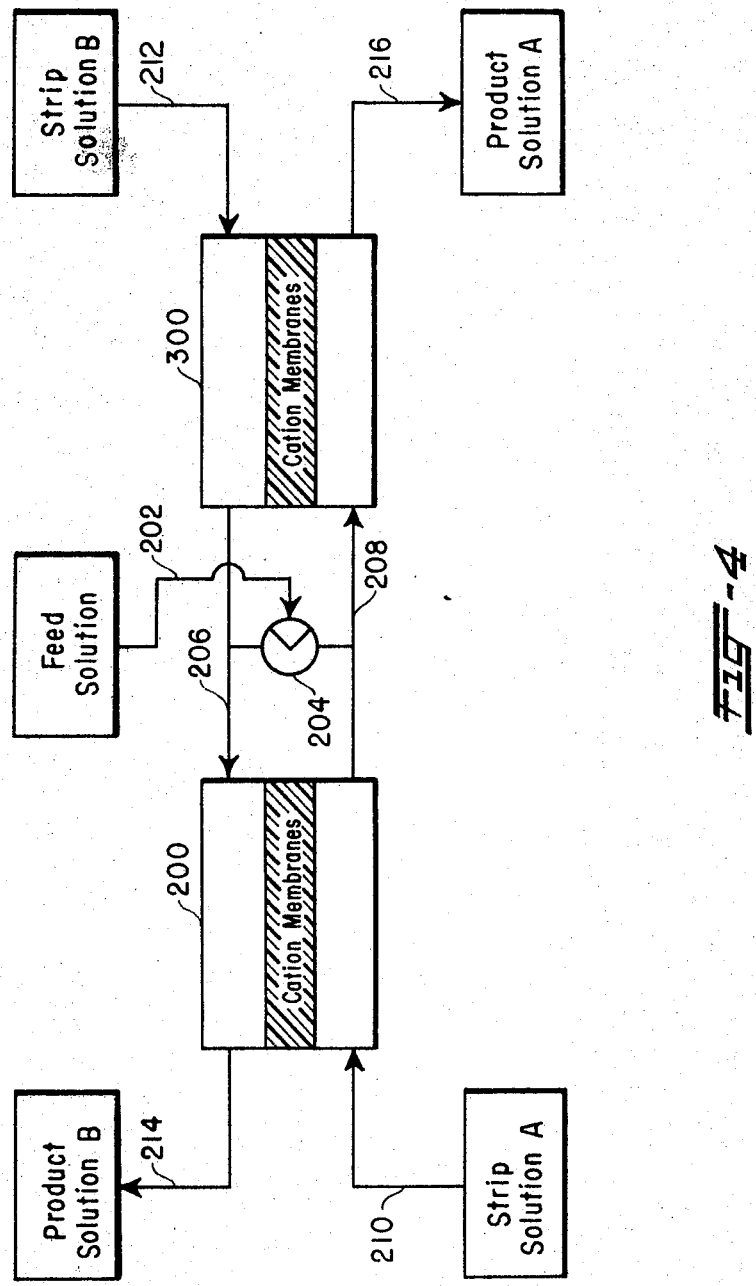

United States Patent Office 3,454,490
Patented July 8, 1969

3,454,490
CONCENTRATION OF IONS USING ION
SELECTIVE MEMBRANES
Richard M. Wallace, Aiken, S.C., assignor to the United
States of America as represented by the United States
Atomic Energy Commission
Filed Aug. 10, 1966, Ser. No. 571,653
Int. Cl. C02b 1/74; B01d 13/00
U.S. Cl. 210—22                                    10 Claims

ABSTRACT OF THE DISCLOSURE

A continuous method for the selective concentration and separation of ion species in aqueous solutions using cation and anion selective membranes. Aqueous solutions containing different ion species having the same polarity are passed in contact with opposite sides of an ion selective membrane having polar selective permeability for the ion species to be concentrated. The compositions of both solutions are continuously controlled to maintain a difference in the chemical potential of the ion species on opposite sides of the membrane and the solutions are maintained in contact with the membrane to effect a transfer of one of the ion species across the membrane. Simultaneously a portion of other ion species having the same polarity are transferred from the opposite side of the membrane. The differences in chemical potentials may be based on a difference in charge on the ions as well as on a difference in ion concentration. Transfer of ion species across the membrane is significantly enhanced by the use of complexing agents capable of preferentially complexing ion species to be concentrated. Single stage and multistage membrane assemblies are described for efficient concentration of ion species using the method of this invention.

---

This invention described herein was made in the course of, or under, a contract with the U.S. Atomic Energy Commission.

This invention relates to a method for the concentration and separation of ions in aqueous solutions. More particularly, the invention relates to the continuous concentration and separation of ion species in aqueous solutions using ion selective membrane systems.

Ion selective or permselective membranes are semipermeable membranes which will preferentially transfer ions of a particular polarity. Heretofore, membranes having ion selective characteristics have been extensively used in the process of electrodialysis wherein ionic compounds are separated and concentrated by forced transfer across ion selective membranes using an externally applied electrical potential. In electrodialysis, concentration of ion species is usually conducted in an apparatus comprising a series of compartments partitioned by ion selective membranes. The membranes are usually arranged in a sequence, alternating between cation permeable and anion permeable membranes. Solutions containing the ion species to be separated are pumped through the compartments in a suitable order and an electrical potential is applied across the system by means of electrodes in compartments at each end of a membrane stack. When solutions containing ion species are passed through the compartments into contact with the membranes and an electrical potential is applied, anions are forced through the anion permeable membrane in one direction while cations are simultaneously forced through the cation permeable membranes in the other direction, thus concentrating the ion species in alternate compartments and diluting it in adjacent ones. See U.S. Patent 2,636,852 issued to W. Juda et al. on Apr. 28, 1953, U.S. Patent Re. 24,865 issued to W. Juda et al. on Sept. 6, 1960, and U.S. Patent 3,228,867 issued to W. K. Chen on Jan. 11, 1966. As shown in these patents, this process has proved particularly useful in concentrating salt from sea water and in treating brackish water, as well as in removing salts from solutions of non-ionic compounds. Electrodialysis, however, is relatively nonspecific because all of the cations are transferred through the cation membrane and all of the anions are transferred through the anion membrane by the applied electrical potential and large separation of different kinds of ions is not obtained. Other difficulties inherent in electrodialysis systems include (1) excessive power consumption and loss due to voltage drops across the solutions and membranes; (2) means must be provided to remove $H_2$ and $O_2$ evolved in electrode compartments of the system; (3) the membrane stack must be constructed of non-conducting material so that all of the current will be carried by the solutions and membranes; and (4) expensive materials, such as platinum, must be used for the electrodes.

With these inherent difficulties of the prior art in mind, it is a general object of the present invention to provide an improved method for the separation and concentration of ion species in aqueous solutions using ion selective membranes.

Another object of this invention is to provide an ion selective membrane method for the separation and concentration of ion species in aqueous solutions which does not require the use of an externally applied electrical potential.

Still another object of the present invention is to provide a method for the continuous countercurrent separation and concentration of ion species in aqueous solution using ion selective membranes.

These and other objects are accomplished in the present invention by providing an ion selective membrane process for the continuous separation and concentration of ion species in aqueous solutions wherein the driving force for the concentration is provided by the difference in chemical potentials of the ions in the respective solutions. These chemical potentials are the partial molar free energies of the various ions in the respective aqueous solutions.

In accordance with the broadest aspects of this invention, a continuous method is provided wherein ions in aqueous solutions are selectively concentrated and separated by contacting a first aqueous solution containing a first ion species that is to be concentrated with one side of an ion selective membrane having polar selective permeability for the ion species and simultaneously contacting a second aqueous solution containing a second ion species having the same polarity as the first ion species with the opposite side of the membrane. The compositions of both solutions are controlled to maintain a difference in chemical potentials of the ion species and these solutions are maintained in contact with their respective sides of the membrane for sufficient time to produce the transfer of a substantial portion of the first ion species and a portion of the second ion species through the membrane, whereby the first ion species is concentrated in the second aqueous solution. The first ion species is then recovered from the second solution by conventional means. As will be shown in examples hereinafter, such a concentration effected by control of the compositions to maintain differences in chemical potentials of the various ions may be based on a difference in charge on the ions as well as on a difference in ion concentration.

Although this invention is not to be understood as limited to a particular theory, at least a partial explanation for its unexpected success can be found in the Donnan membrane theory. See F. G. Donnan, Chem. Rev. 1, 73 (1924). Donnan showed that under certain conditions ions would diffuse from a first solution through a semipermeable membrane to a second solution and that at equilibrium these ions would be at a higher concentration in the second solution than in the first. This flow of ions up a concentration gradient was found to occur only when different ions of the same polarity are simultaneously diffusing from the second solution to the first and the total concentration of ions in the second solution is greater than the first. The diffusion of water by osmotic pressure from the first solution to the second is another effect occurring simultaneously during ion diffusion. This osmotic effect tends to dilute the second solution and it is necessary to minimize dilution of the second solution by water diffusing due to osmotic pressure by the selection of suitable membranes and by the control of solution flow rates.

In accordance with another aspect of the present invention, it has been found that if a complexing agent capable of preferentially complexing the ion species to be separated or concentrated is placed on the opposite side of the membrane from said ion species, the continuous concentration and separation of the ion species will be greatly enhanced. In such a case the complexing agent, which may be either an ion or neutral molecule in one of the solutions, provides the energy for the transfer by a chemical reaction between the ion being transferred and the complexing agent. Further, the ion species can diffuse not only in a direction opposite to its concentration gradient but also diffuse opposite to the direction predicted by ordinary Donnan membrane theory. That is, an ion species that forms a complex may concentrate in a dilute solution of the complexing agent on one side of the membrane while ordinarily (in the absence of a complexing agent) it would be expected to concentrate in the more concentrated solution.

The ability to change the chemical potentials of different ion species by varying the composition and concentration of solutions on opposite sides of the membrane allows a higher degree of selectivity and process control to be obtained than is possible with prior art dialysis or electrodialysis. Therefore, the present method has been found to be particularly useful for the separation of charged ions, such as uranyl ions and strontium ions, present in small quantities in aqueous nuclear fuel processing solutions. It is also useful for the separation of rare earths and fission products from nuclear fuel material processing, based on their ability to form complexes with specific ions or with specific molecules.

Although the choice of ion selective membrane material for use in the present method is not critical, a number of membrane properties should be considered to achieve efficient concentration and separation of ion species. First, the membrane must have high ion selectivity by permitting preferential diffusion of the ions to be concentrated while at the same time excluding ions of opposite polarity and limiting the diffusion of water by osmotic pressure. In addition to high ion selectivity, the membrane should have good chemical stability to resist hydrolytic degradation and oxidative breakdown, good radiolytic stability to resist degradation when used in contact with radioactive solutions, and good mechanical structural integrity to withstand fluid flow and pressure.

A wide variety of ion selective membranes of the type known in the art as homogeneous, heterogeneous and graft-copolymer membranes may be satisfactorily employed in the method of the present invention. Homogeneous membranes are made from the condensation products of phenolsulfonic acid or its derivatives and formaldehyde (for cation selective properties) and of polyethyleneimine and epichlorohydrin (for anion selective membranes). Homogeneous cation- and anion-selective membranes can be prepared by condensation of these monomers on mercury or acid-resistant plates or by heating a pre-condensed, viscous reaction mixture between glass plates. Heterogeneous membranes are generally prepared by embedding colloidal particles of ion exchange resin material in an inert binder which provides the necessary structural strength. Among suitable ion exchange resin material are cross-linked polystyrenes with sulfonic acid functional groups for strong-acid cation exchange properties or quaternary ammonium functional groups for strong-base anion exchange properties. Suitable binders include polyethylene, polystyrene, phenolic resins, and polymethacrylates.

Membranes that have been found to be particularly useful when employing the solutions hereinafter described in the examples are those membranes prepared by graft-copolymerization processes. In these processes, hydrophobic films, such as polyethylene and polychlorotrifluoro ethylene, are impregnated with styrene or styrene-divinylbenzene mixtures and are then exposed to $\gamma$ radiation from a $^{60}Co$ source. The irradiation causes the styrene and divinylbenzene to be graft-copolymerized into the film base. To obtain strong-acid cation selective membranes, the graft-copolymer membrane is then sulfonated by conventional means. Similarly, to obtain strong-base anion selective membranes, the graft-copolymer membrane is treated by chloromethylation of the phenyl groups followed by amination with tertiary amines to form quaternary ammonium functional groups. Strong-acid cation selective membranes prepared by this process are between about 0.15 and 0.30 mm. in thickness and have dry cation exchange capacities between about 0.6 and 1.6 meq./g. The strong-base anion selective membranes have the same thickness with anion exchange capacities between about 1.3 and 2.0 meq./g. Detailed descriptions of suitable membranes, including methods of preparation, are thoroughly disclosed in the following publications: Kirk-Othmer Encyclopedia of Chemical Technology, 2nd Ed., vol. 7, pp. 847–849, Interscience Publishers (1965); Helfferich, F., Ion Exchange, pp. 61–65, 339–416 and 583, McGraw-Hill Book Co., Inc., New York (1962); Friedlander, H. Z., Rickles, R. N., Anal. Chem. 37, 30A (1965); Lakshminarayanaiah, N., Chem. Rev. 65, 548 (1965).

Membranes prepared by the hereinabove described graft-copolymer process are available commercially from the American Machine and Foundry Company, New York, N.Y. under the trade name "AMFion." Strong-acid cation membranes are AMFion C–60, AMFion C–103C, and AMFion C–313 and strong-base anion membranes are AMFion A–60 and AMFion A–104B. In the examples hereinafter presented "strong-acid cation selective membrane" refers to a membrane that has a polyethylene-styrene matrix with sulfonic acid ionic groups and that is prepared by the graft-copolymer process, such as the membrane available commercially under the designation "AMFion C–103C." "Strong-base anion selective membrane" refers to a membrane that has a polyethylene-styrene matrix with quaterinary ammonium groups and is also prepared by the graft-copolymer process, such as the membrane available commercially under the designation "AMFion A–104B."

The present invention will be more fully understood from the following detailed description and representative examples considered in connection with the drawings, in which:

FIGURE 3 is a flow sheet for one typical method of adapting multistage ion selective membrane assemblies to a continuous countercurrent concentration system. The embodiment shown is for the concentration of uranyl nitrate solution.

FIGURE 4 is a flowsheet of another typical method of carrying out the present process using a pair of multistage membrane assemblies having a "center-fed" feed input system for the simultaneous separation of two ion species. This embodiment shows the separation of Ag⁺ and Cu²⁺ from aqueous solution.

Figure 1:
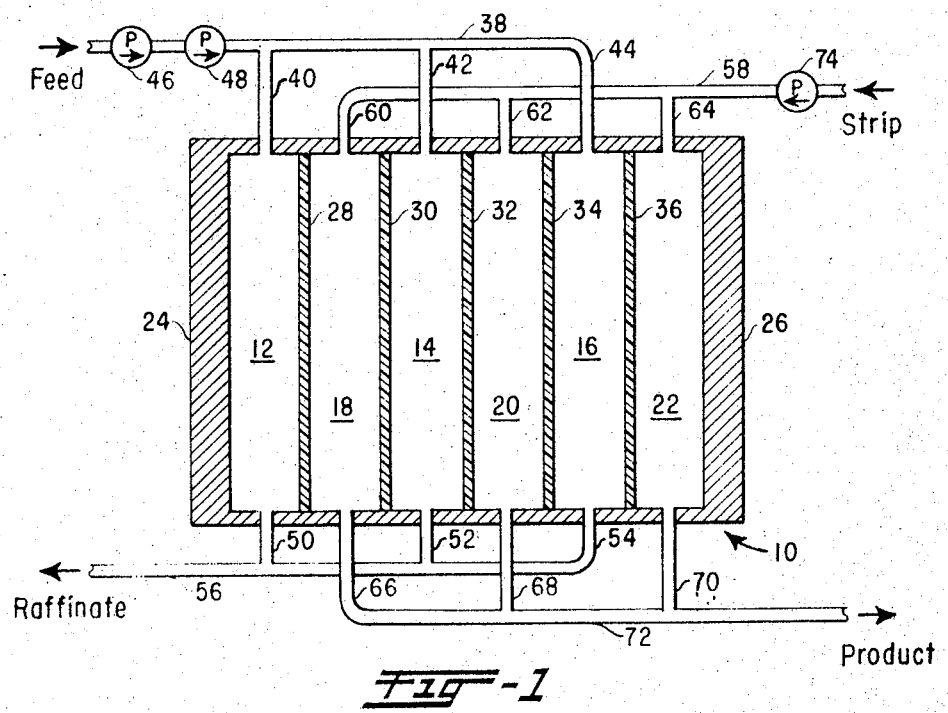
FIGURE 1 is a schematic cross-section of a parallel flow ion selective membrane assembly for single-stage concentration of ions from aqueous solutions.

The ion selective membrane assembly shown in FIGURE 1 is a parallel flow embodiment suitable for illustrating the single stage concentration of ions in aqueous solutions. The membrane assembly 10, which is arranged similar to conventional dialysis and electrodialysis membrane stacks or cells, comprises a plurality of parallel feed solution compartments 12, 14, 16 adjacent parallel strip solution compartments 18, 20, 22 disposed between a pair of end plates 24, 26. The respective feed and strip compartments are physically separated by semipermeable membranes 28, 30, 32, 34, 36 consisting of a suitable ion selective material having polar selective permeability for the ion species to be concentrated. That is, cation selective membranes are employed to concentrate cations such as uranyl ions or strontium ions while anion selective membranes are employed to concentrate particular anions, such as in acid neutralization as hereinafter described. End plates 24 and 26 hold the stack of compartments together in a suitable frame as in conventional electrodialysis apparatus. Feed input is provided into feed compartments 12, 14, 16 by feed inlet manifold 38 which distributes feed solution to feed compartment inlets 40, 42, 44 respectively. The feed solution stream is supplied to the feed inlet manifold 38 by feed metering pump 46 connected in series with a feed pulse pump 48. The pulse pump 48 agitates the feed solution back and forth to prevent a concentration gradient in a direction normal to the surface of the membrane from developing in the solution. Feed compartments 12, 14, 16 are also provided with raffinate (depleted feed solution) outlet means 50, 52, 54 connected to a raffinate outlet manifold 56 to extract the raffinate from said compartments. Similarly, the strip solution stream is introduced by strip inlet manifold 58 into the strip compartments 18, 20, 22 through strip compartment inlets 60, 62, 64 and extracted as a product solution concentrated in the desired ions through product outlets 66, 68, 70 connected to a product manifold 72. The strip solution is supplied to the strip inlet manifold 58 by a strip metering pump 74.

Figure 2:
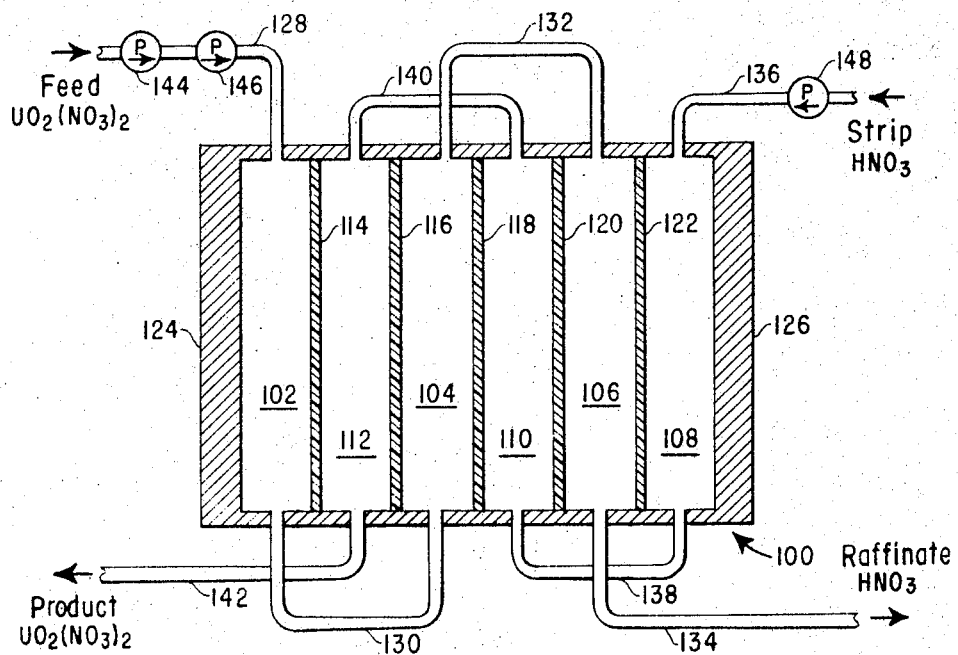
FIGURE 2 is a schematic cross-section of an ion selective membrane assembly arrangement for the multistage countercurrent concentration of uranyl ions from aqueous solutions using cation selective membranes.

It will be apparent to those skilled in the art that instead of a single stage parallel cocurrent flow of the feed and strip solutions, a countercurrent multistage arrangement will provide a more efficient concentration of ions. Such an arrangement is illustrated in FIGURE 2 which shows a schematic cross section of a three stage ion selective membrane assembly for the concentration of uranyl ions from aqueous nitrate solution. As in the assembly illustrated in FIG. 1, ion selective membrane assembly 100 of FIG. 2 comprises six compartments alternately divided into three feed solution compartments 102, 104, 106 and three strip solution compartments 108, 110, 112, respectively, separated by suitable ion selective membranes 114, 116, 118, 120, 122 having polar selective characteristics. This stack of compartments and membranes is also arranged and disposed, in conventional manner, in a suitable frame between a pair of end plates 124 and 126. Each of the compartments is provided with inlet and outlet means. Feed solution input is provided to the first feed compartment 102 by feed inlet means 128. Feed solution from the first feed compartment 102, is transferred into the second feed compartment 104 through feed conduit means 130, is transferred from the second feed compartment 104 into the third feed compartment 106 through a second feed conduit means 132 and emerges through raffinate outlet means 134 as depleted raffinate. Feed solution flow into inlet means 128 is provided by feed metering pump 144 and solution agitation is provided by feed pulse pump 146. Strip solution is introduced through strip inlet means 136 into the first strip compartment 108, is transferred to the second strip compartment 110 through strip conduit means 138, is transferred to the third strip compartment 112 through a second strip conduit means 140 and emerges from the third strip compartment as a product solution concentrate through product outlet means 142. The strip solution flow is supplied by strip metering pump 148. A pulse pump is unnecessary for the strip solution because the pulsing action of the feed pulse pump 146 is transmitted to the strip solution by the resultant flexing of the membranes. This arrangement has the unique advantage of simultaneous alternate cocurrent and countercurrent flow of both the feed and strip solutions in contact with the membranes. Although FIGURE 2 shows for exemplary purposes a six-compartment three-stage arrangement, it should be noted that any number of stages may be used for the most efficient concentration of the ion species being separated and that two adjacent compartments may serve as a stage, or multicompartment single stage units such as used in FIG. 1 may be used for each stage.

The feed and strip compartments used in FIGS. 1 and 2 are preferably provided with conventional "over-and-under" baffles to provide structural support for the membrane and to provide for maximum uniform contact between the flow solutions and the membrane surfaces.

Utlizing these apparatus, if a dilute feed solution of a salt of a cation to be concentrated and a non-complexing anion is introduced into the membrane assembly to contact one side of a cation selective membrane and a concentrated strip solution of an acid or a salt of another cation having the same anion is supplied to the assembly and into contact with the other side of the membrane, the cation originally in the dilute solution diffuses through the membranes and concentrates in the more concentrated solution. The condition for equilibrium for such a system may be based on Donnan membrane theory wherein:

$$(C_{1R}/C_{1L})^{Z_2} = (C_{2R}/C_{2L})^{Z_1}$$

where $C_{1R}$ and $C_{1L}$ are activities (approximately the concentration) of the first cation on the right and left sides of the membrane respectively, $C_{2R}$ and $C_{2L}$ are the same quantities for the second cation while $Z_1$ and $Z_2$ are the respective charges on the first and second cation. Therefore, ions of higher charge are concentrated preferentially over ions of lower charge. Thus, if the dilute and concentrated solutions flow countercurrent to each other in alternate compartments of the membrane assembly with the concentrated solution allowed to flow at a much slower rate than the dilute solution, a high concentration of the ion originally in the dilute solution can be achieved with a nearly complete removal of said ions from the dilute solution.

The present method can best be understood by reference to the following typical and representative examples wherein the method of the present invention will be described primarily with respect to the concentration of uranyl ions in aqueous solutions. Other examples will illustrate the effect of the addition of complexing agents to enhance the separations and the application of the present method to the continuous concentration and separation of other ion values in aqueous solutions.

EXAMPLE I

Concentration of uranyl ion with nitric acid

A stack of 23 strong-acid cation selective membranes was assembled to form 24 flow compartments as in FIG. 2 hereinabove described. The cross section of each membrane was approximately 3" x 3" and with baffles the total cross sectional area exposed to contact with each solution for the 23 membranes was about 75 square inches. Synthetic feed solutions containing 0.01 mole per liter uranyl nitrate were fed through the feed compartments of the membrane assembly at the rate of 5 ml. per minute. The feed rate was maintained by a feed metering pump and agitated by a feed pulse pump. Stripping solutions containing 2.0 moles per liter of nitric acid were fed into the stripping compartments at varying rates. Each run was continued for about 8 hours at room temperature to attain a steady state. The result of these runs is shown in the following Table I:

higher concentrations result with 2 M $H_2SO_4$ without unduly large amounts of uranyl ion remaining in the raffinate.

TABLE I.—CONCENTRATION OF URANYL NITRATE WITH NITRIC ACID

Feed Solution: 0.01 M $UO_2(NO_3)_2$; no $HNO_3$
Strip Solution: 2.0 M $HNO_3$

| Run No. | Flow Rates, ml./min. | | | | Analyses, M | | | |
|---|---|---|---|---|---|---|---|---|
| | Feed and Raffinate | Strip | Product [a] | $\alpha$ [b] | Product $UO_2^{2+}$ | Raffinate $UO_2^{2+}$ | Product $H^+$ | Raffinate $H^+$ |
| 1 | 5.0 | 0.040 | 0.0995 | 0.80 | 0.282 | $24.6 \times 10^{-4}$ | 0.0126 | 0.0292 |
| 2 | 5.0 | 0.050 | 0.112 | 1.00 | 0.274 | $17.8 \times 10^{-4}$ | 0.0297 | 0.0231 |
| 3 | 5.0 | 0.060 | 0.142 | 1.20 | 0.273 | $7.5 \times 10^{-4}$ | 0.0466 | 0.0244 |
| 4 | 5.0 | 0.075 | 0.176 | 1.50 | 0.268 | $3.3 \times 10^{-4}$ | 0.109 | 0.0270 |
| 5 | 5.0 | 0.100 | 0.230 | 2.00 | 0.210 | $1.3 \times 10^{-4}$ | 0.269 | 0.0292 |
| 6 | 5.0 | 0.200 | 0.339 | 4.00 | 0.148 | $0.7 \times 10^{-4}$ | 0.551 | 0.0315 |

[a] The increased flow rate in the product stream over the strip solution was caused by the transfer of water through the membranes by osmosis.
[b] $\alpha$ = equivalents of nitrate ion per unit of time entering in the strip/equivalents of uranyl ion per unit of time in the feed.

Table I shows that uranyl ion can be concentrated using a countercurrent cation selective membrane assembly by diffusion across the cation membranes in the absence of applied electrical potential. The ratio $\alpha$, defined in Table I, is a useful operating parameter for membrane concentration of uranium, because it is a measure of the stoichiometric saturation of the product solution with respect to uranium when all of the uranium is removed from the feed solution. Thus, the value of ratio $\alpha$ is an index of the approach to conditions that will yield maximum concentration. It will be noted that the product concentration remains fairly constant up to $\alpha = 1.5$ in run number 4 and that the loss of uranium in the raffinate decreased with the further increase in $\alpha$. Run number 4, thus, represents the optimum stoichiometric saturation of the product solution with respect to uranium for the system being used.

Greater concentrations than those obtained in Example I can be achieved by using a strip solution consisting of a concentrated solution of an acid or salt of an ion that preferentially complexes the cation to be concentrated. This will be shown in Example II wherin uranyl ion is concentrated from dilute solutions of uranyl nitrate using a uranyl ion complexing agent, sulfuric acid, as the stripping solution.

EXAMPLE II

Concentration of uranyl ion with sulfuric acid, a complexing agent for uranyl ion Synthetic feed solutions containing 0.01 mole per liter of uranyl nitrate were fed into the feed compartments of the cation membrane assembly described in Example I at several flow rates between 5 and 10 ml. per minute. Stripping solutions containing 1 and 2 mole per liter, respectively, of sulfuric acid were fed into the stripping compartments at varying rates. Each run was continued for about 8 hours at room temperature to attain a steady state. The result of these runs is shown in Table II:

TABLE II.—CONCENTRATION OF URANYL ION WITH SULFURIC ACID

Feed Solution: 0.01 M $UO_2(NO_3)_2$; no $HNO_3$
Strip Solutions:
Runs 1 and 2, 1 M $H_2SO_4$
Runs 3–7, 2 M $H_2SO_4$

| Run* No. | Flow Rates, ml./min. | | | Analyses, M | | | |
|---|---|---|---|---|---|---|---|
| | Feed and Raffinate | Strip | Product | Product $UO_2^{2+}$ | Raffinate $UO_2^{2+}$ | Product $H^+$ | Raffinate $H^+$ |
| 1 | 5.0 | 0.060 | 0.144 | 0.341 | $1.41 \times 10^{-4}$ | 0.101 | 0.0214 |
| 2 | 6.0 | 0.072 | 0.169 | 0.341 | $3.32 \times 10^{-4}$ | 0.166 | 0.0215 |
| 3 | 6.0 | 0.036 | 0.134 | 0.405 | $3.56 \times 10^{-4}$ | 0.081 | 0.0205 |
| 4 | 7.0 | 0.042 | 0.155 | 0.420 | $3.94 \times 10^{-4}$ | 0.154 | 0.0218 |
| 5 | 8.0 | 0.048 | 0.166 | 0.448 | $7.62 \times 10^{-4}$ | 0.194 | 0.0218 |
| 6 | 9.0 | 0.054 | 0.177 | 0.463 | $7.45 \times 10^{-4}$ | 0.226 | 0.0215 |
| 7 | 10.0 | 0.060 | 0.191 | 0.451 | $9.83 \times 10^{-4}$ | 0.266 | 0.0215 |

*All of these runs were conducted at $\alpha = 1.2$ ($\alpha$ = equivalents of sulfate ion per unit of time in the strip/equivalents of uranyl ion per unit of time in the feed).

Table II shows that even higher concentrations of uranyl ion (from 0.01 M up to about 0.45 M) can be obtained using a complexing agent as the tsripping solution. It will be noted that faster feed flow rates may be used and The application of this method to the concentration of trivalent cations is shown by the following Example III, wherein trivalent lanthanum ion is concentrated by stripping with nitric acid and by complexing with ethylenediaminetetraacetic acid (EDTA).

EXAMPLE III

Concentration of trivalent lanthanum

Synthetic feed solutions containing 0.0103 M $La(NO_3)_3$ were fed into the feed compartments of the cation selective membrane assembly described in Example I. Two runs were conducted, one using a strip solution containing 2.02 M nitric acid and one using a complexing agent, 0.1 M ethylenediaminetetraacetic acid (EDTA) at pH 7. The flow rates of $La^{3+}$ analyses are shown in Table III:

TABLE III.—CONCENTRATION OF $La^{3+}$

Feed Solution: 0.0103 M $La(NO_3)_3$
Strip Solutions:
Run 1, 2.02 M $HNO_3$
Run 2, 0.1 M EDTA (pH 7)

| Run No. | Flow Rates, ml./min. | | | Analyses, M | |
|---|---|---|---|---|---|
| | Feed and Raffinate | Strip | Product | Product $La^{3+}$ | Raffinate $La^{3+}$ |
| 1 | 3 | 0.067 | 0.113 | 0.257 | $0.89 \times 10^{-3}$ |
| 2 | 2 | 0.500 | | 0.040 | $0.018 \times 50^{-3}$ |

These runs demonstrate the effectiveness of the present method for the concentration of trivalent as well as divalent cations. Trivalent lanthanum ions were concentrated from a dilute solution of $La(NO_3)_3$ with nitric acid strip solution almost as efficiently as uranyl ions in the previous examples. This method is also applicable for the concentration of other trivalent cations such as $Pu^{3+}$, $Ce^{3+}$, $Eu^{3+}$, $Am^{3+}$, $Cm^{3+}$, and $Cf^{3+}$ by using a strip solution containing a preferential complexing agent for the cation to be recovered.

In addition to increasing the concentration of ions in aqueous solutions the present method is also useful for the preferential separation of particular ions from aqueous solutions based on a complex formation as shown in the following Example IV for the separation of strontium ion.

EXAMPLE IV

Removal of strontium ion from $NaNO_3$ by complexing

A synthetic feed solution (1) containing 0.1 mole per liter of sodium nitrate and $1.19 \times 10^{-3}$ moles per liter of strontium nitrate was fed into the feed compartments of the cation membrane assembly described in Example I at the rate of 1.98 ml. per minute. A strip solution (2) containing 0.04 mole of sodium ethylenediaminetetraacetate (EDTA) adjusted to pH 10 was fed into the stripping compartments at a rate of 0.1 ml. per minute. The run continued for 7 hours to allow a steady state to be established. The flow rates and $Sr^{2+}$ analyses of the solution streams are shown in Table IV:

TABLE IV.—REMOVAL OF $Sr^{2+}$ FROM $NaNO_3$ BY COMPLEXING WITH EDTA

| Stream No. | Flow Rates, ml./min. | $Sr^{2+}$, moles/liter |
|---|---|---|
| (1) Feed | 1.98 | $1.19 \times 10^{-3}$ |
| Raffinate | *1.98 | $2.8 \times 10^{-7}$ |
| Strip | 0.1 | 0.00 |
| (2) Product | *0.1 | $2.28 \times 10^{-2}$ |

*Flow rates did not change appreciably because the osmotic pressure of both the feed and the strip were nearly the same.

Thus, preferential complexing of $Sr^{2+}$ by EDTA provides a means for the separation and concentration of $Sr^{2+}$ from an aqueous solution containing both strontium and sodium cations.

Although, in the above examples, cation selective membranes are used, it is to be understood that the present process is also useful for the separation of anions using anion selective membranes based on difference in charge or complex formations. A particularly useful application of the present method using anion selective membranes is for the neutralization of acid solutions without introducing extraneous metal ions such as would be obtained by adding sodium hydroxide. However, neutralization of acidic process solutions may be accomplished without the introduction of extraneous cations by the transfer of anion species across anion selective membranes. The acidic solution to be neutralized is fed through alternate compartments in an assembly of anion selective membranes while the solution of a base, such as sodium hydroxide is introduced into the compartments on opposite sides of the membranes (see FIG. 2). The anions associated with the acid and the hydroxide ions exchange places by selective transfer across the membrane and said hydroxide ions neutralize the hydrogen ions originally in the acid solution as in the following Example V.

EXAMPLE V

Neutralization of uranyl nitrate solutions containing nitric acid

A stack of 17 strong-base anion selective membranes was constructed into an assembly of 18 flow compartments in the same manner as shown in FIG. 2 and as described in Example I for cation selective membranes. An acidic feed solution (1) containing 0.01 mole per liter of uranyl nitrate and 0.10 mole per liter of nitric acid was fed into the feed compartments of the anion membrane assembly at a flow rate of 4.5 ml. per minute. A neutralizing solution (2) containing 1.0 mole per liter of sodium hydroxide was fed into the opposite compartments at the rate of 1.75 ml. per minute. As in the above examples the solutions were pulsed to provide adequate agitation. The analyses of this run are shown in the following Table V:

TABLE V.—NEUTRALIZATION OF URANYL NITRATE SOLUTION

| Stream | pH | $H^+$, molarity | $UO_2^{2+}$, moles/liter | $Na^+$, moles/liter |
|---|---|---|---|---|
| (1) Acidic feed | 1 | 0.1 | 0.01 | 0.00 |
| Deacidified feed | 3.35 | $<10^{-3}$ | 0.01 | $2.7 \times 10^{-3}$ |
| Neutralizing solution | | | 0.00 | 1.0 |
| (2) Depleted solution | | | $1.3 \times 10^{-3}$ | 1.0 |

The free acid concentration of the feed solution was reduced almost to zero since the pH of a pure 0.01 molar solution of uranyl nitrate is 3.3. Also, the loss of uranium to the sodium hydroxide neutralizing solution was less than 0.06%. Therefore, excellent neutralization of acid solutions may be achieved without significant loss of desired ions to the neutralizing solution using the method of the present invention.

The neutralization method of Example V and the concentration method described in Example I was combined into a continuous countercurrent system for the concentration of uranium from dilute uranyl nitrate solutions. This system, which is shown schematically in the flowsheet in FIGURE 3 comprises three multistage membrane assemblies in series, one anion membrane assembly for deacidification of the acidic uranyl nitrate solution, a cation membrane assembly for the concentration of deacidified uranyl nitrate solution, and a second cation membrane assembly for recycle concentration of the depleted uranyl nitrate solution raffinate. A continuous concentration of uranyl nitrate using the flowsheet of FIGURE 3 is described in the following Example VI.

EXAMPLE VI

Continuous concentration of uranyl nitrate

A three liter batch of synthetic acidic feed solution containing 0.01 M $UO_2(NO_3)_2$ and 0.3 M $HNO_3$ was processed using the flowsheet of FIGURE 3. The feed solution was fed to the feed compartments of the deacidifier (a 17 anion selective membrane assembly) at a flow rate of 2.7 ml./min. A neutralizing solution of 1.5 M NaOH was supplied to the compartments on the opposite sides of the anion membranes at 6 ml./min. Both streams were agitated by pulse pumps. The deacidifier effluent solution, containing 0.01 M $UO_2^{2+}$ and 0.056 M $Na^+$ at pH 3.82 was then fed into the feed compartments of the first concentrator (a 23 cation selective membrane assembly) at a flow rate of 5.13 ml./min. A 2.0 M $HNO_3$ stripping solution was fed into the stripping compartments of the cation membrane assembly at 0.075 ml./min. The feed solution, emerging depleted to about 0.001 M $UO_2^{2+}$ from the first concentrator, was in turn fed to the recycle concentrator. The stripping solution of 2.0 M $HNO_3$ was fed to recycle concentrator stripping compartments at 0.060 ml./min. The analyses of the efflent solutions from the batch run is summarized in the following Table VI:

TABLE VI.—CONTINUOUS CONCENTRATION OF URANYL NITRATE USING FLOWSHEET OF FIGURE 3

Feed solution: 0.01 M $UO_2(NO_3)_2$; 0.3 M $HNO_3$
Neutralizing solution: 1.5 M NaOH
Strip solutions: 2.0 M $HNO_3$

| Solution | Flow Rates, ml./min. | Analyses, M | | |
|---|---|---|---|---|
| | | $UO_2^{2+}$ | $H^+$ | $Na^+$ |
| Product | 0.189 | 0.270 | 0.131 | 0.086 |
| Recycle | 0.230 | 0.026 | 0.208 | 0.086 |
| Raffinate | 5.13 | $0.01 \times 10^{-3}$ | 0.040 | 0.0016 |

These results demonstrate that uranyl nitrate solutions having a high concentration of acid can be deacidified and concentrated from 0.01 mole per liter to 0.27 mole per liter uranyl ion in a continuous countercurrent membrane system with negligible loss of uranium to the raffinate. A significant characteristic of this system is that the quality of the product solution obtained by this continuous membrane separation is superior to that obtained by conventional ion exchange resin methods, because the product contains only little excess acid in contrast to the high concentrations of nitric acid or ammonium nitrate obtained in the elution of uranium from ion exchange resin columns.

Simultaneous separation of two cation species can be achieved with the present method by using a pair of cation selective membrane assemblies arranged for common feed solution input ("center-fed") and having means for introducing two different strip solutions as shown schematically in FIGURE 4. Referring to FIGURE 4, a first cation membrane assembly 200 and a second cation membrane assembly 300 are provided with a common feed inlet 202 and a two-way feed valve 204 for introducing a feed solution to the respective assembly through feed conduit means 206 and 208. Strip solution inlet means 210 is provided for introducing a strip solution A into the strip compartments of assembly 200 and a second strip solution inlet means 212 is provided to introduce strip solution B into the strip compartments of assembly 300. Product outlet means 214 and 216 are also provided for membrane assemblies 200 and 300, respectively. The operation of the "center-fed" system shown in FIGURE 4 will be described in the following Examples VII and VIII in connection with the separation of silver and copper ions.

EXAMPLE VII

Separation of silver from copper ions based on differences in ionic charge

The "center-fed" cation membrane system shown in FIG. 4 was employed for the separation of $Ag^+$ from $Cu^{2+}$ in aqueous nitrate solution. Strip solution A, the concentrated solution, containing 1.0 M $HNO_3$ was introduced into the stripping compartments of membrane assembly 200 and strip solution B, the dilute solution, containing 0.25 M $HNO_3$ was introduced into the stripping compartment of membrane assembly 300. The feed solution comprising 0.1 M $Cu(NO_3)_2$ and 0.1 M $AgNO_3$ was introduced through valve 204 into the rapidly moving dilute stream (solution B). All solutions were fed by metering pumps and the two stripping solutions A and B were pulsed by pulse pumps to provide agitation. The flow rates and product analyses are shown in the following Table VII:

TABLE VII.—SEPARATION OF SILVER FROM COPPER IONS BASED ON DIFFERENCES IN IONIC CHARGE

Feed Solution: 0.1 M $Cu(NO_3)_2$+0.1 M $AgNO_3$
Strip Solution A: 1.0 M $HNO_3$
Strip Solution B: 0.25 M $HNO_3$

| Run No. | Flow ml./min. | | | Cu Product A | | | Ag Product B | | |
|---|---|---|---|---|---|---|---|---|---|
| | Feed | Strip A | Strip B | Molarity, Ag+Cu | Mole Percent Ag | Mole Percent Cu | Molarity Ag+Cu | Mole Percent Ag | Mole Percent Cu |
| 1 | 0.15 | 0.2 | 1.5 | 0.0262 | 10 | 90 | 0.0218 | 68 | 32 |
| 2 | 0.30 | 0.4 | 3.0 | 0.0435 | 13 | 87 | 0.0181 | 64 | 36 |

These results show that these two cations can be separated from each other on the basis of differences in ionic charge. Equimolar quantities of copper and silver in the feed solution were separated into two enriched fractions, one enriched in copper and the other enriched in silver.

As shown in previous examples, a complexing agent can be introduced into the stripping solution to enhance the concentration and separation of desired ion species. One or more complexing agents can also be introduced through the medium of the strip solution or the feed solution using the "center-fed" systems of FIG. 4. In the following Example VIII, complexing agents are added to the solutions.

EXAMPLE VIII

Separation of silver and copper ions by complexing

The "center-fed" membrane system shown in FIG. 4 was employed for the separation of $Ag^+$ and $Cu^{2+}$ in aqueous solution by complexing with complexing agents specific for the ions to be separated. The feed solution comprising 0.1 M $Cu(NO_3)_2$ and 0.1 M $AgNO_3$ was introduced into the noncomplexing solution B in runs 1–3 and into the complexing solution A in runs 4–7. In runs 1–3, complexing strip solution A contained 0.1 M diethylenetriaminepentaacetic acid (DTPA), a copper complexing agent at pH 4 and in runs 4–7, 0.05 M DTPA at pH 7. In runs 1–3, noncomplexing strip solution B contained 0.1 M $NaNO_3$ and in runs 4–7, 0.3 M $NaNO_3$. As in Example VII, the solutions were fed by metering pumps and the strip solutions were agitated by pulse pumps. The flow rates and product analyses are shown in the following Table VIII:

TABLE VIII.—SEPARATION OF SILVER AND COPPER IONS BY COMPLEXING

Feed Solution: 0.1 M $Cu(NO_3)_2$+0.1 M $AgNO_3$
Complexing Solution A:
  Runs 1–3; 0.01 M DTPA, pH 4
  Runs 4–7; 0.05 M DTPA, pH 7
Noncomplexing Solution B:
  Runs 1–3; 0.1 M $NaNO_3$
  Runs 4–7; 0.3 M $NaNO_3$

| Run No. | Flow, ml./min. | | | Analyses | | | | |
|---|---|---|---|---|---|---|---|---|
| | | | | Cu Product A | | Ag Product B | | |
| | Feed | Strip A | Strip B | Molarity, Ag+Cu | Mole Percent, Ag | Molarity Ag+Cu | Mole Percent, Cu | |
| *Feed added to noncomplexing solution B* | | | | | | | | |
| 1 | 0.1 | 1.2 | 2.0 | $9.4\times10^{-3}$ | <0.025 | $4.9\times10^{-3}$ | 2.5 | |
| 2 | 0.1 | 1.2 | 1.0 | $9.0\times10^{-3}$ | <0.025 | $9.3\times10^{-3}$ | 3.2 | |
| 3 | 0.1 | 1.5 | 1.0 | $5.9\times10^{-3}$ | <0.03 | $8.9\times10^{-3}$ | 0.3 | |
| *Feed added to complexing solution A* | | | | | | | | |
| 4 | 0.1 | 0.22 | 1.0 | 0.058 | 0.12 | 0.031 | 1.2 | |
| 5 | 0.2 | 0.44 | 2.0 | 0.037 | 0.06 | 0.016 | 1.4 | |
| 6 | 0.4 | 0.88 | 4.0 | 0.031 | 1.1 | 0.009 | 0.22 | |
| 7 | 0.4 | 0.88 | 3.0 | 0.031 | 1.8 | 0.011 | 0.18 | |

The above Table VIII shows that good separations of two ion species can be obtained either by adding the feed to the complexing solution or to the noncomplexing solution. The best separation in runs 1–3 was obtained in run 3 when the flow of the complexing solution A was adjusted to give a 50% excess of DTPA over copper; the copper product solution A was practically free of detectable silver (<0.03 mole percent) and the silver product solution B contained only 0.3 mole percent of copper. Runs 4–7 demonstrated that even larger capacities can be obtained when the feed is added to the complex solution A and the product solutions consistently yielded products containing less than 2 mole percent of the other component.

Although the method of the preceding Example VIII provided good separation of copper and silver, still better results can be obtained if the sodium nitrate in solution B is replaced by a specific complexing agent for silver, such as sodium thiosulfate. Example IX illustrates this method.

EXAMPLE IX

Separation of silver and copper ions by complexing

The "center-fed" membrane system shown in FIGURE 4 was again used for the separation of $Ag^+$ and $Cu^{2+}$ in aqueous solutions by complexing with complexing agents specific for both the ion species being separated. Strip solution A contained 0.05 M diethylenetriaminepentaacetic acid (DTPA), a copper complexing agent, and strip solution B contained 0.1 M sodium thiosulfate ($Na_2S_2O_3$) as the preferential complexing agent for silver. The feed solution comprising 0.1 M $Cu(NO_3)_2$ and 0.1 M $AgNO_3$ was introduced into the slowest moving stream (solution A) containing the DTPA complexing agent. As in the previous examples, the solutions were fed by metering pumps and the strip solution were agitated by pulse pumps. The flow rates and analyses are shown in the following Table IX:

TABLE IX.—SEPARATION OF SILVER AND COPPER IONS BY COMPLEXING

Feed Solution: 0.1 M $Cu(NO_3)_2$+0.1 M $AgNO_3$
Strip Solution A: 0.05 M DTPA, pH 7
Strip Solution B: 0.1 M $Na_2S_2O_3$

| Flow, ml./min. | | | Analyses | | | |
|---|---|---|---|---|---|---|
| | | | Cu Product A | | Ag Product B | |
| Feed | Strip A | Strip B | Molarity, Ag+Cu | Mole Percent, Ag | Molarity, Ag+Cu | Mole Percent, Cu |
| 0.1 | 0.88 | 1.0 | 0.0305 | 0.09 | 0.038 | 0.15 |

It will be noted that this method gives a very good separation of the desired product components in that each product solution contains very little of the other component. The copper product solution A contains less than 0.09 mole percent silver and the silver product solution B contains less than 0.15 mole percent copper.

As heretofore described, the selection of an ion selective membrane material is not critical and a wide variety of membranes may be satisfactorily used in the method of the present invention. However, it is useful to determine the relative efficiencies of the various types of membranes for the solutions to be concentrated. Example X is representative of such a determination.

EXAMPLE X

Membrane efficiency tests

A countercurrent membrane assembly comprising one membrane and two flow compartments was assembled in the same manner as shown in FIG. 2. Four types of membranes were tested in the assembly. Two strong-acid cation selective membranes prepared by the graft-copolymer process each having different ion exchange capacities, one strongly ionized heterogeneous membrane, and one cation exchange membrane cast as a homogeneous film were tested. The latter two membranes were fabric reinforced.

Synthetic feed solutions of 0.01 M uranyl nitrate were fed into the feed compartment of the assembly and stripping solutions of 3.0 M nitric acid were fed into the strip compartment for each membrane tested. The flow rate for both feed and stripping solutions was 25 ml./min. at room temperature with pulsing agitation of the feed solution. The flow was maintained for 5 hours to achieve a steady state and the product and raffinate streams analyzed for uranium. The results of these tests are shown in Table X:

TABLE X.—MEMBRANE EFFICIENCY TESTS

Feed Solution: 0.01 M $UO_2(NO_3)_2$
Strip Solution: 3.0 M $HNO_3$
Flow: 0.25 ml./min. (each stream)

| Membrane Material | Thickness, mils (wet) | Exchange capacity, meq./g.(dry) | Analyses, M | |
|---|---|---|---|---|
| | | | Product U | Raffinate U |
| Graft-copolymer (AMFion C-313) | 6.5 | 0.6 | $1.05 \times 10^{-2}$ | $7.5 \times 10^{-5}$ |
| Graft-copolymer (AMFion C-103C) | 7.5 | 1.2 | $8.0 \times 10^{-3}$ | $3.0 \times 10^{-4}$ |
| Heterogeneous [1] (IONAC MC3142) | 8.0 | | $9.4 \times 10^{-3}$ | $1.5 \times 10^{-3}$ |
| Homogeneous [2] (IONICS CR610) | 23 | 2.8 | $7.9 \times 10^{-3}$ | $3.2 \times 10^{-3}$ |

[1] Fabric reinforced, trademark of Ionac Chemical Co., Birmingham, N.J.
[2] Fabric reinforced, trademark of Ionics Incorporated, Cambridge, Mass.

The results of these tests show that a wide variety of ion selective membrane types may be used for concentrating uranyl ion and that the best overall results were obtained using graft copolymer membranes.

Although the instant invention has been discussed primarily with regard to the concentration and separation of several specific ions such as uranyl, strontium, lanthanum, copper and silver ions, it will be apparent to those skilled in the art that the present method is broadly applicable to any ions that have heretofore been concentrated by conventional ion exchange techniques. Ions separated or concentrated in the manner set forth hereinabove may be recovered from the product solutions by any suitable conventional means such as precipitation, ion exchange or solvent extraction.

It will be understood that the foregoing description and examples are not intended to restrict the scope of the present invention and the invention should be construed as limited only to the extent indicated by the appended claims.

What is claimed is:
1. A continuous method for the selective concentration and separation of ions in aqueous solutions comprising:
  (a) continuously passing a first aqueous solution containing a first ion species to be concentrated in contact with one side of an ion selective membrane having polar selective permeability for said ion species;
  (b) simultaneously continuously passing a second aqueous solution containing a second ion species, having the same polarity of said first ion species, in contact with the opposite side of said membrane;
  (c) controlling the compositions of the respective solutions to continuously maintain differences in the chemical potentials of said ion species in said solutions and maintaining said first and second solutions in contact with said membrane for sufficient time to continuously effect the preferential transfer of a substantial portion of said first ion species across said membrane into said second solution and the simultaneous transfer of a portion of said second ion species across said membrane into said first solution; and

(d) recovering said first ion species from said second solution.

2. The method of claim 1 wherein said compositions are controlled by a difference in ion concentration between said first and said second solutions.

3. The method of claim 1 wherein said compositions are controlled by a difference in charge between said first ion species and said second ion species.

4. The method of claim 1 wherein at least one of said solutions contains a complexing agent to preferentially complex the ion species to be concentrated.

5. The method of claim 1 wherein said ion selective membrane is a cation selective membrane, said first ion species are actinide values and said second ion species are cations other than said actinide values.

6. The method of claim 1 wherein a complexing agent is added to said second solution to preferentially complex said first ion species to be concentrated.

7. A continuous method for the concentration and separation of actinide values from acidic aqueous solutions containing said values comprising:
   (a) continuously passing said acidic aqueous solution containing said values in contact with one side of an anion selective membrane while simultaneously passing a basic aqueous solution in contact with the opposite side of said membrane,
      (1) controlling the compositions of the respective solutions to continuously maintain differences in the chemical potentials of the anion species in said solutions, and
      (2) maintaining said solutions in contact with said anion membrane for sufficient time to effect the transfer of a sufficient portion of said anion species across said membrane to provide a substantially acid-free aqueous solution containing said actinide values; and
   (b) continuously passing said acid-free aqueous solution containing said actinide values in contact with one side of a cation selective membrane while simultaneously passing an aqueous strip solution containing cations other than said actinide values in contact with the opposite side of said membrane,
      (1) controlling the compositions of the respective solutions to continuously maintain differences in the chemical potentials of the cation species in said solutions, and
      (2) maintaining said solutions in contact with said cation membrane for sufficient time to effect the transfer of a substantial portion of said actinide values across said membrane, thereby concentrating said actinide values in said aqueous strip solution.

8. The method of claim 7 wherein said actinide values are uranyl ions, said basic aqueous solution is sodium hydroxide, and said strip solution is nitric acid.

9. A continuous method for the simultaneous concentration and separation of a plurality of cation species from an aqueous feed solution using a plurality of strip solutions comprising:
   (a) continuously passing first and second aqueous strip solutions countercurrently in contact with the opposite sides of cation selective membranes in first and second cation membrane assemblies,
   (b) continuously introducing between said membrane assemblies a portion of said aqueous feed solution containing said cation species into said first aqueous strip solution leaving the first membrane assembly,
   (c) controlling the compositions of the respective solutions to continuously maintain differences in the chemical potentials of the respective cation species in said solutions, and
   (d) maintaining said first and second strip solutions in contact with said cation membranes in said membrane assemblies for sufficient time to effect the transfer of a portion of one cation species across the membrane in said first membrane assembly and the transfer of a portion of another cation species across the membrane in said second membrane assembly thereby concentrating and separating said cation species in said first and second solutions respectively, the product solutions being the strip solutions that have passed through both of said membrane assemblies.

10. The method of claim 9 wherein at least one of said strip solutions contains a complexing agent to preferentially complex at least one of said cation species.

References Cited

UNITED STATES PATENTS

| | | | |
|---|---|---|---|
| 2,937,924 | 5/1960 | Schubert | 23—317 |
| 2,947,688 | 8/1960 | Murphy | 210—500 X |
| 3,228,877 | 1/1966 | Mahon | 210—22 |
| 3,272,737 | 9/1966 | Hansen et al. | 210—500 X |
| 3,342,719 | 9/1967 | Chen et al. | |

FOREIGN PATENTS 1,387,457  12/1964  France.

OTHER REFERENCES

Fischbeck et al., "Compensation of Acidity Differences With Permselective Membranes," presented at the First International Symposium on Water Desalination, held Oct. 3–9, 1965, 3 pages.

Sollner, "Recent Advances in the Electrochemistry of Membranes of High Ionic Selectivity," from Journal of The Electrochemical Society, July 1950, pp. 1396–1516 relied on.

REUBEN FRIEDMAN, *Primary Examiner.*

FRANK A. SPEAR, JR., *Assistant Examiner.*

U.S. Cl. X.R.

210—321